W. H. RUSSELL.
COOKING SET.
APPLICATION FILED MAY 2, 1921.

1,387,667.

Patented Aug. 16, 1921.

Inventor
William Huntington Russell.

UNITED STATES PATENT OFFICE.

WILLIAM HUNTINGTON RUSSELL, OF NEW HAVEN, CONNECTICUT.

COOKING SET.

1,387,667.

Specification of Letters Patent. Patented Aug. 16, 1921.

Application filed May 2, 1921. Serial No. 466,213.

*To all whom it may concern:*

Be it known that I, WILLIAM HUNTINGTON RUSSELL, a citizen of the United States, residing at New Haven, in the county of New Haven and State of Connecticut, have invented certain new and useful Improvements in Cooking Sets, of which the following is a specification.

The invention relates to a cooking device which may be used separately or in combination.

One of the objects of the invention is to provide a kettle which will be economical in using heat and which may be used with auxiliary cooking utensils over the same burner.

My invention, by providing a large surface for the distribution of heat and allowing the heat to come in contact with either a large or small amount of the inner surface of the kettle economizes in the heat consumed. The amount of heat allowed to go in the inner upper part of the kettle and around any auxiliary cooking utensil placed within the said inner upper part is regulated by a device placed within the vertical passage through the kettle, so constructed that the passage from the lower part of the said vertical passage may be opened or closed, thereby regulating the flow of heat into the upper part of the said passage.

With these and other objects in view, the invention consists in the novel construction and arrangement of parts hereafter fully described and claimed, it being understood that that various changes in the form and construction of the device or number or shape of the auxiliary cooking utensils, within the scope of the claims, may be resorted to without departing from the spirit or sacrificing any of the advantages of the invention.

Figure 1:
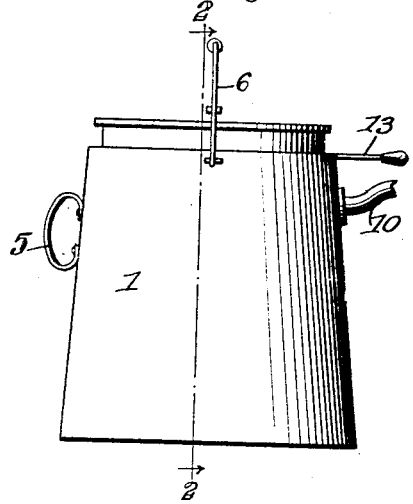
Figure 2:
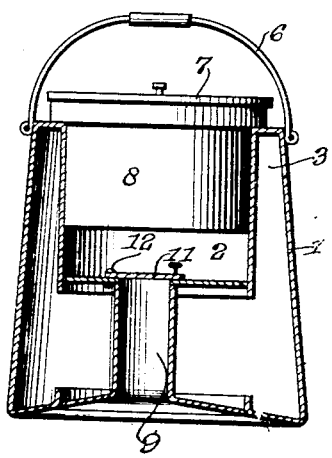
Figure 3:
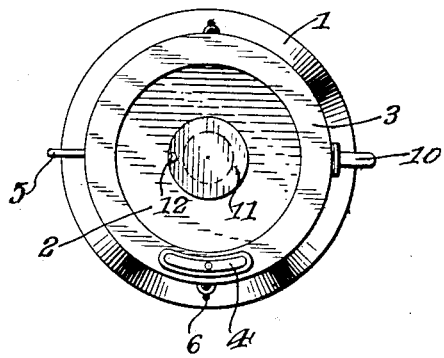
Figure 4:
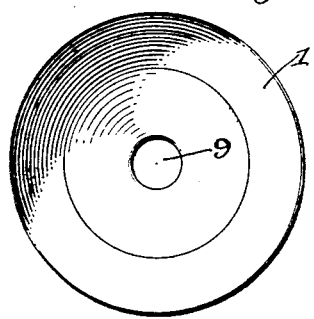

In the drawings, Figure 1 is a side view of my cooking device. Fig. 2 shows the inside of the device. Fig. 3 is a top view; and Fig. 4 is a bottom view.

Like numerals of reference designate corresponding parts in all the figures and drawings.

Referring to the preferred form of the invention by numerals, I designates the kettle, and 2 the upper vertical passage and 9 the lower vertical passage. The cover II of the lower part of the vertical passage is pivoted to the kettle at 12. The cooking pan 8 fits into the vertical passage from the top and the said pan 8 is supported by having its upper surface extend over the sides of the kettle and it is grasped by means of a handle 13. The upper passage 2 is larger than the lower passage 9.

The cover of pan 8 is also used as a cover for the top of the passage of the kettle in which the pan 8 is placed. The water is poured into the kettle through an opening 4 into the reservoir 3. The kettle is grasped by means of handles 5 and 6.

What I claim—

1. A kettle with a vertical passage through it, means for regulating the size of the passage between the lower and upper part of said vertical passage and a cover for the top of said vertical passage, substantially as set forth.

2. A kettle having a narrow vertical passage at its bottom and a large vertical opening at its top, said narrow passage having a cover which separates the two passages, said kettle having a spout, two handles and an opening for pouring water into it, and a cover for the large vertical passage at the top of the kettle.

3. A cooking set comprising a kettle with a vertical passage through it, one or more pans placed in said vertical passage and means for regulating the flow of heat under said pan or pans, substantially as set forth.

In testimony whereof I affix my signature.

WILLIAM HUNTINGTON RUSSELL.